United States Patent
Kesavan

(10) Patent No.: US 6,228,815 B1
(45) Date of Patent: May 8, 2001

(54) SOLID LUBRICANTS CONTAINING BISMUTH SULFIDE FOR USE IN FRICTION LINING

(75) Inventor: Sunil Kumar Kesavan, Troy, MI (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/458,116

(22) Filed: Jun. 29, 1999

(51) Int. Cl.⁷ .................................................. C10M 125/22
(52) U.S. Cl. ............................................ 508/108; 508/100
(58) Field of Search ..................... 508/100, 108

(56) References Cited

U.S. PATENT DOCUMENTS 3,839,208 * 10/1974 Hermann et al. ...................... 252/12
3,839,209 * 10/1974 Hermann et al. ...................... 252/12
5,288,792 * 2/1994 Buxbaum ............................. 252/25
5,856,278 * 1/1999 Brewer ................................ 508/105
5,958,846 * 9/1999 Geringer .............................. 508/108

FOREIGN PATENT DOCUMENTS

95/02657   1/1995 (WO).

OTHER PUBLICATIONS

English Abstract of SU 1,731,619.

* cited by examiner

*Primary Examiner*—Ellen M. McAvoy

(57) ABSTRACT

Solid lubricant compositions containing bismuth sulfide for use in friction linings for applications such as, but not limited to brake disk pads, brake drums, and clutch disks, are described. The bismuth sulfide is preferably present in the amount of from about 2 to about 10 volume percent, based on the total volume of the friction material matrix.

7 Claims, 2 Drawing Sheets

SOLID LUBRICANTS CONTAINING BISMUTH SULFIDE FOR USE IN FRICTION LINING

BACKGROUND OF THE INVENTION

1. Technical Field

The present invention relates generally to lubricants and more particularly to solid lubricants containing bismuth sulfide for use in friction linings for applications such as, but not limited to, brake disk pads, brake drums, and clutch disks.

2. Discussion

Friction linings such as those typically employed in brake linings and clutch linings are usually comprised of either asbestos fibers, mixtures of asbestos fibers and other heat resistant inorganic or organic fibers, asbestos-free mixtures of heat resistant inorganic or organic fibers, or metal powders such as iron powder, copper powder, steel powder or mixtures thereof, in combination with an organic monomeric or polymeric binder system (e.g., phenolic or cresylic resin). Because asbestos has been alleged to be the cause of certain health problems and is no longer environmentally acceptable, most modern friction linings are made without asbestos. Thus, most current friction linings are made from synthetic and steel fibers, and iron, ceramic, and metallic powders.

A typical friction lining formulation may optionally contain one or more of the following components: thermosetting resinous binders (e.g., phenolic resins such as phenol-formaldehyde resins, epoxies, and the like) present in conventional amounts; reinforcing fibers (e.g., aramid, steel, acrylic, and the like) present in conventional amounts; metal powders (e.g., iron, copper, brass, zinc, aluminum, antimony, and the like) present in conventional amounts; solid lubricants (e.g., molybdenum disulfide, graphite, coke, stannic sulfide, antimony trisulfide, and the like) present in conventional amounts; abrasives (e.g., tin oxide, magnesia, silica, iron oxide, alumina, rutile, and the like) present in conventional amounts; organic fillers (e.g., rubber particles, cashew nut shell particles, nitrile rubber particles, and the like) present in conventional amounts; and inorganic fillers (e.g., barytes, gypsum, mica, and the like) present in conventional amounts. Other materials may be added as well, as is known in the art.

As noted, both asbestos-containing as well as asbestos free friction linings may contain one or more solid lubricants in order to improve the tribological properties of such materials, particularly their friction and wear properties.

The known solid lubricant combinations and the friction materials prepared with them, fiber based as well as metal based, are on the whole not entirely satisfactory with respect to their tribological properties. For example, friction materials having satisfactory wear properties and adequate narrow coefficients of friction can be prepared with commercially available solid lubricants. However, these prepared friction materials do not offer vibration-free operation nor do they adequately prevent the transfer of friction material to the metallic friction surfaces. In addition, these solid lubricant combinations cannot always be incorporated with equally good results in the various compositions for preparing friction materials. They therefore cannot be universally incorporated into friction materials based on asbestos fibers, other fibers or metal powders.

Another concern with the known solid lubricant combinations and the friction materials prepared with them, is the level of noise or "equal" produced when automobile operators actuate the braking systems. For example, automotive brake part (e.g., brake pads) manufacturers are particularly interested in noise-reducing lubricants. One such lubricant which reportedly has noise-reducing qualities is lead sulfide. However, lead sulfide is not environmentally acceptable, and therefore is not well-suited for use as a friction material lubricant.

Therefore, there exists a need for a solid lubricant combination which is environmentally acceptable, reduces the noise levels of friction materials, can be used as an additive to friction materials in order to improve their tribological properties, which can be universally incorporated in a variety of compositions for the preparation of friction materials, especially in asbestos-free, semi-metallic, and/or low-metallic friction materials, and which yields an improved friction material having low wear properties and narrow coefficients of friction which, above all, offer vibration-free operation, and which do not result in the transfer of friction materials to the opposing friction plane of the article in question such as, for example, a brake disk, brake drum, or a clutch plate.

SUMMARY OF THE INVENTION

In accordance with one embodiment of the present invention, a friction material matrix comprises at least one solid lubricant, the solid lubricant containing bismuth sulfide; and at least one binder system.

In accordance with another embodiment of the present invention, a solid lubricant composition comprises bismuth sulfide, wherein the solid lubricant composition is incorporated into a friction material matrix, and the bismuth sulfide is present in an amount of from about 2 to about 10 volume percent based on the total volume of the friction material matrix.

In accordance with yet another embodiment of the present invention, a braking element comprises a friction material matrix, the friction material matrix containing at least one solid lubricant, wherein the solid lubricant comprises bismuth sulfide, and the bismuth sulfide is present in an amount of from about 2 to about 10 volume percent based on the total volume of the friction material matrix.

A more complete appreciation of the present invention and its scope can be obtained from the following brief description of the drawings, detailed description of the invention, and the appended claims.

DETAILED DESCRIPTION OF THE INVENTION

As that term is used herein, "friction material matrix" means at least one solid lubricant containing bismuth sulfide, at least one binder system (e.g., phenolic resin), and optionally, additives such as, but not limited to, reinforcing fibers, metal powders, additional lubricants, abrasives, organic fillers, inorganic fillers, and the like.

In accordance with a preferred embodiment of the present invention, the bismuth sulfide-containing lubricant is present in the friction material matrix in an amount of from about 2 to about 10 volume percent, based on the total volume of the friction material matrix. In accordance with a highly preferred embodiment of the present invention, the bismuth sulfide-containing lubricant is present in the friction material matrix in an amount of about 2.5 volume percent, based on the total volume of the friction material matrix.

Bismuth sulfide, also referred to as bismuth trisulfide, has the empirical chemical formula of $Bi_2S_3$. Bismuth sulfide has a melting point of approximately 850° C., making it an excellent choice for inclusion with solid lubricant formulations employed in high temperature applications.

By way of a non-limiting example, a typical formulation of a friction material matrix containing bismuth sulfide, in accordance with one embodiment of the present invention, is presented in Example I, below:

| Component | Volume Percent of the Friction Material Matrix |
|---|---|
| Kevlar ™ Pulp | 2–6 |
| Coarse Natural Graphite | 5–15 |
| Phenolic Resin | 8–20 |
| Copper Fiber | 2–8 |
| Bismuth Sulfide | 2–10 |
| Rubber Dust | 3–12 |
| Molybdenum Disulfide | 0.5–3 |
| Coke Powder | 2–12 |
| Mineral Fiber | 5–15 |
| Friction Dust | 5–15 |
| Vermiculite | 5–10 |
| Barium Sulfate Filler | 10–25 |
| Titanium Dioxide Abrasive | 2–10 |

By way of a non-limiting example, a typical formulation of a friction material matrix containing bismuth sulfide, in accordance with another embodiment of the present invention, is presented in Example II, below:

| Component | Volume Percent of the Friction Material Matrix |
|---|---|
| Kevlar ™ Pulp | 2.5 |
| Coarse Natural Graphite | 11 |
| Phenolic Resin | 17.5 |
| Copper Fiber | 4 |
| Bismuth Sulfide | 2.5 |
| Rubber Dust | 5.5 |
| Molybdenum Disulfide | 1.5 |
| Coke Powder | 3 |
| Mineral Fiber | 7 |
| Friction Dust | 12 |
| Vermiculite | 6 |
| Barium Sulfate Filler | 20.5 |
| Titanium Dioxide Abrasive | 7 |

The solid lubricants of the present invention can be used either alone or in combination with other sulfides (like those of molybdenum, copper, zinc, antimony, tin, titanium, iron, tungsten) in lead-free friction materials used in automotive and industrial brakes, cerametallic friction materials, clutches, as well as other industrial applications. Sulfides of the type mentioned, such as, but not limited to tin sulfide and titanium sulfide, can be employed to supplement the noise abatement characteristics of the bismuth sulfide.

Figure 1:
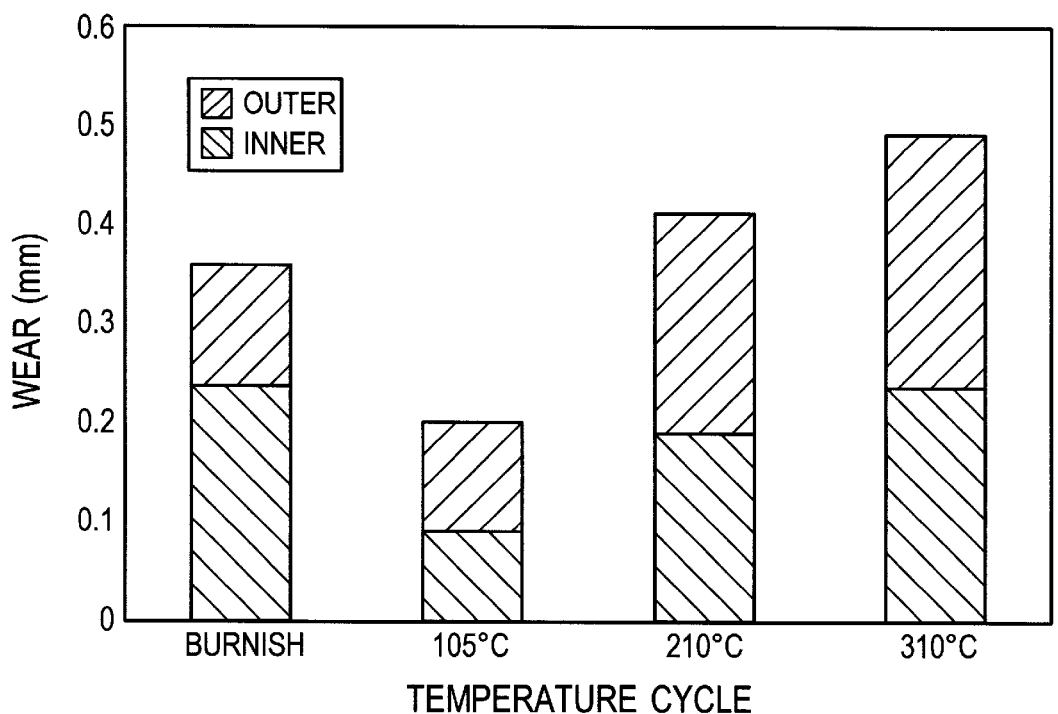
FIG. 1 is a graphical illustration of the results of a dynamometer test of the wear characteristics of a pair of brake pads having a brake lining formulation containing no bismuth sulfide.
Figure 2:
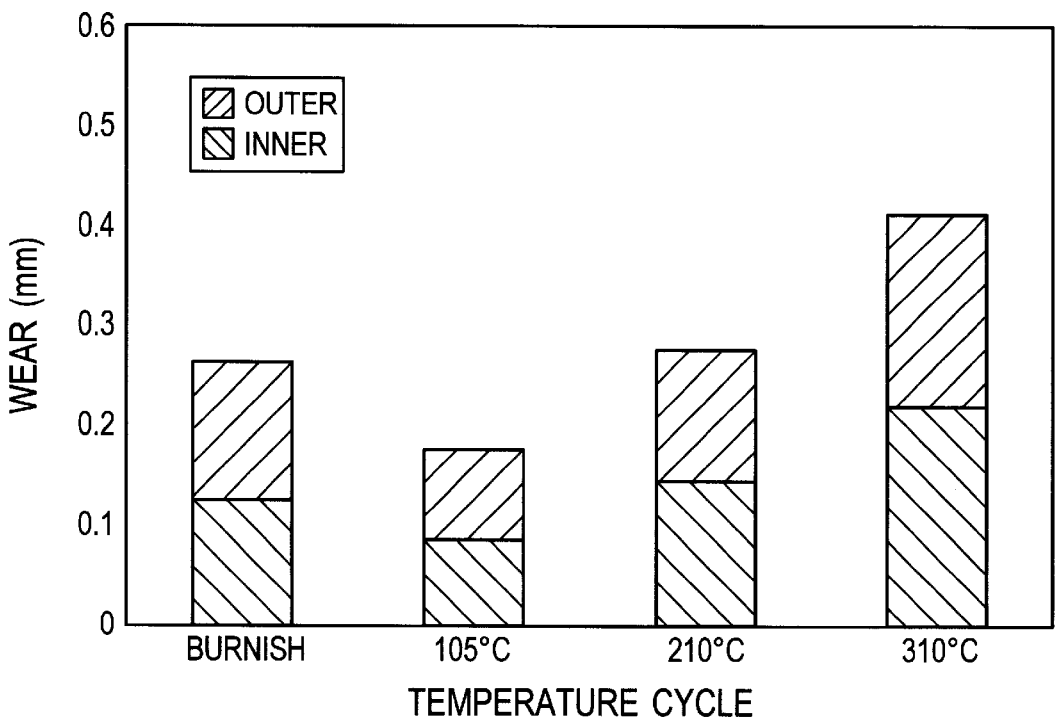
FIG. 2 is a graphical illustration of the results of a dynamometer test of the wear characteristics of a pair of brake pads having a brake lining formulation containing bismuth sulfide present at levels in accordance with the present invention.

The bismuth sulfide-containing solid lubricants of the present invention reduce the tendency for brakes to generate noise by stabilizing the friction value and reducing vibrations. In order to evaluate the wear performance of brake pads having a friction lining formulation containing bismuth sulfide at levels in accordance with the present invention, a comparison test was performed. A first pair of brake pads (designated R58K) having a friction lining formulation containing no bismuth sulfide was subjected to a dynamometer test in order to evaluate the inner and outer pad wear at various temperatures (see FIG. 1). A second pair of brake pads (designated R58K1) having a friction lining formulation containing bismuth sulfide present at levels in accordance with the present invention, i.e., about 2.5 volume percent, was also subjected to a dynamometer test in order to evaluate the inner and outer pad wear at various temperatures (see FIG. 2). For both formulations, wear measurements were taken at burnish, 105° C., 210° C. and 310° C., respectively. As can be determined from comparing FIG. 1 with FIG. 2, the pad wear of the R58K formulation, especially at 210° and 310° C., was significantly higher than the R58K1 formulation, thus indicating that brake pads containing a bismuth sulfide formulation in accordance with the present invention will be better able to resist wear at elevated temperatures.

Figure 3:
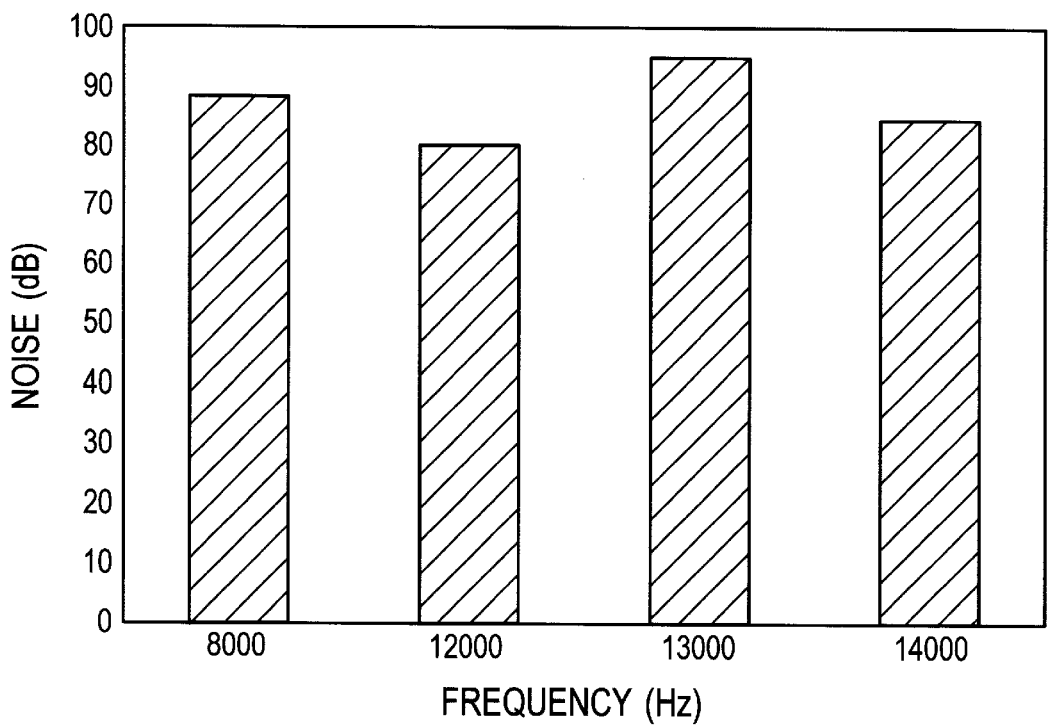
FIG. 3 is a graphical illustration of the results of a dynamometer test of the noise characteristics of a pair of brake pads having a brake lining formulation containing no bismuth sulfide.
Figure 4:
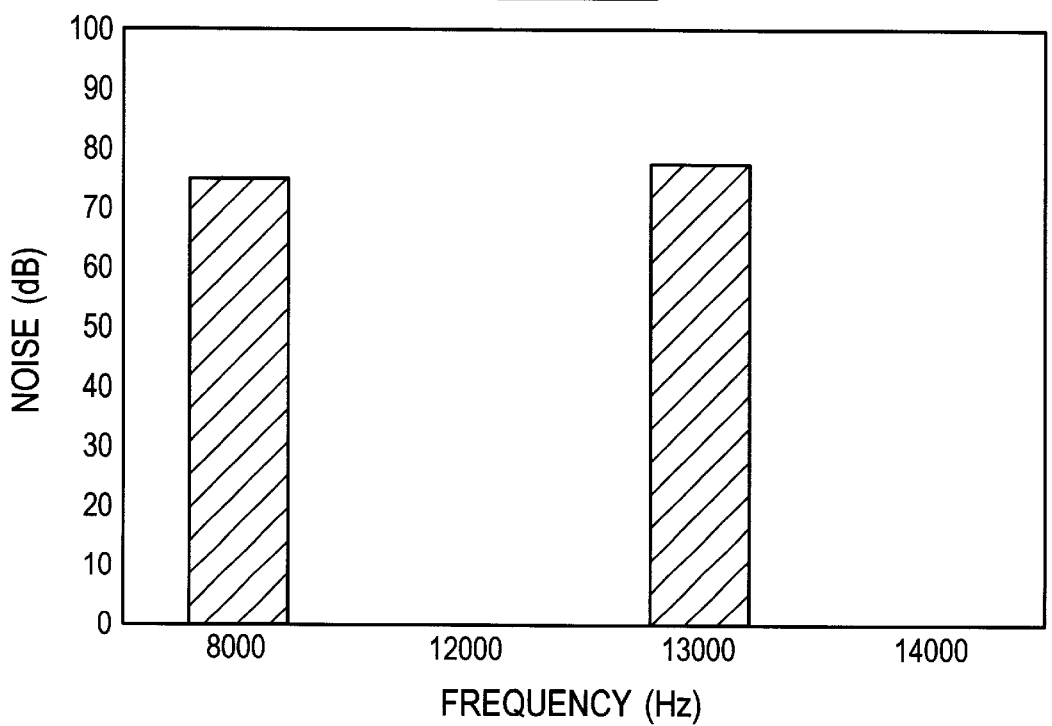
FIG. 4 is a graphical illustration of the results of a dynamometer test of the noise characteristics of a pair of brake pads having a brake lining formulation containing bismuth sulfide present at levels in accordance with the present invention.

Additionally, a comparison test was performed in order to evaluate the noise performance of brake pads having a friction lining formulation containing bismuth sulfide at levels in accordance with the present invention. Again, a first pair of brake pads having a friction lining formulation containing no bismuth sulfide (e.g., R58K) was subjected to a dynamometer test in order to evaluate the total noise produced at various frequencies (see FIG. 3). A second pair of brake pads having a friction lining formulation containing bismuth sulfide present at levels in accordance with the present invention (i.e., R58K1) was also subjected to a dynamometer test in order to evaluate the total noise produced at various frequencies (see FIG. 4). As can be determined from comparing FIG. 3 with FIG. 4, the total noise of the R58K formulation, especially at 8000 Hz and 13000 Hz, was significantly higher than the R58K1 formulation, thus indicating that brake pads containing a bismuth sulfide formulation in accordance with the present invention will produce less noise, especially less high frequency noise (i.e., squeal). Also noteworthy was the fact that the R58K1 formulation did not produce any squeal whatsoever at the 12000 Hz and 14000 Hz frequencies.

Additionally, the bismuth sulfide-containing solid lubricant of the present invention can be used as a lubricating additive in plastics, composites and miscellaneous applications such as, but not limited to bearings.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A motor vehicle braking element comprising a friction material matrix, said matrix comprising:
   at least one solid lubricant, said solid lubricant comprising bismuth sulfide; and
   at least one binder system.

2. The braking element of claim 1, wherein the bismuth sulfide is present in an amount from about 2 to about 10 volume percent based on the total volume of the friction material matrix.

3. The braking element of claim 1, wherein the bismuth sulfide is present in an amount of about 2.5 volume percent based on the total volume of the friction material matrix.

4. The braking element of claim 1, further comprising any one of the following components:
   at least one reinforcing fiber;
   at least one metal powder;
   at least one abrasive;
   at least one organic filler; and
   at least one inorganic filler.

5. The braking element of claim 1, wherein said solid lubricant further comprises a compound selected from the group consisting of molybdenum sulfide, copper sulfide, zinc sulfide, antimony sulfide, tin sulfide, titanium sulfide, iron sulfide, tungsten sulfide, and mixtures thereof.

6. The braking element of claim 1, wherein said binder system comprises phenolic resin.

7. The braking element of claim 1, wherein said friction material matrix further comprises a compound selected from the group consisting of molybdenum sulfide, copper sulfide, zinc sulfide, antimony sulfide, tin sulfide, titanium sulfide, iron sulfide, tungsten sulfide, and mixtures thereof.

* * * * *